United States Patent [19]

Lowther

[11] 3,942,093

[45] Mar. 2, 1976

[54] MULTIPLE CORONA GENERATOR SYSTEM

[75] Inventor: Frank Eugene Lowther, Severna Park, Md.

[73] Assignee: W. R. Grace & Co., New York, N.Y.

[22] Filed: Dec. 10, 1974

[21] Appl. No.: 534,560

Related U.S. Application Data

[63] Continuation-in-part of Ser. Nos. 456,396, March 29, 1974, and Ser. No. 509,016, Sept. 25, 1974.

[52] U.S. Cl. ................. 321/45 R; 307/11; 307/151; 250/535

[51] Int. Cl.² ......................................... H02M 7/515

[58] Field of Search ................. 317/2 HF, 4, 262 A; 307/132 R, 11, 151, 154; 128/190; 204/176; 307/252 L; 250/535, 536; 321/4, 5, 27 R, 45 R

[56] References Cited

UNITED STATES PATENTS

| | | | |
|---|---|---|---|
| 3,176,211 | 3/1965 | Linn | 321/45 |
| 3,483,462 | 12/1969 | Bedford | 321/45 R |
| 3,496,092 | 2/1970 | Fraser | 321/45 R |
| 3,800,210 | 3/1974 | Caussin | 250/535 |

*Primary Examiner*—William M. Shoop
*Attorney, Agent, or Firm*—Arthur P. Savage

[57] ABSTRACT

A solid state power supply system for multiple corona generators wherein a series of bridge connected corona generators share silicon controlled rectifiers (SCR's). This system provides means by which symmetrical high frequency power may be supplied to a plurality of corona generators while using a minimum number of SCR devices.

7 Claims, 6 Drawing Figures

MULTIPLE CORONA GENERATOR SYSTEM

This application is a continuation-in-part of my U.S. applications Ser. No. 456,396, filed Mar. 29, 1974, and Ser. No. 509,016, filed Sept. 25, 1974.

The present invention relates to high frequency power supply apparatus, and more specifically to solid state frequency converters which are particularly suitable for supplying high voltage symmetrical power to corona generators.

It has been shown that the output of a given corona generator may be increased by increasing the applied power through application of higher frequency. Previous methods for increasing the frequency of standard 60 Hz line voltage have included the use of motor generators and a variety of electronic frequency multipliers. In my U.S. Pat. No. 3,784,838, issued Jan. 8, 1974, I have disclosed a load commutated solid state frequency converter circuit which is capable of producing high frequency unipolar electrical pulses at high voltages. This device is reliable, efficient, and much cheaper to produce than motor generator or conventional commutated solid state electronic high frequency power supplies. It has been found, however, that when corona generators are operated under maximum output conditions, the use of unipolar power apparently tends to cause separation and migration of electrons and positively charged molecules to the respective positive and negative electrodes of the generator. This separation and migration causes nonuniform corona discharge and limits the efficiency of the device. Furthermore, the operational noise level of unipolar devices tends to be high due to unbalanced vibrations which are induced in the high frequency power transformer.

It is therefore an object of the present invention to provide an improved high frequency power supply for corona discharge type apparatus.

It is a further object to provide a solid state load commutated power supply circuit which is capable of producing high frequency symmetrical (bi-polar) power to a multiple corona generator type load, and which employs a reasonable number of solid state devices.

It is yet another object to provide an ozone generator which includes a low cost and efficient source of symmetrical high frequency power and which is capable of operation at an extremely low noise level.

These objects will become readily apparent to one skilled in the art from the following detailed description and drawing wherein.

Broadly, my invention contemplates a load commutated, silicon controlled rectifier (SCR) high frequency converter circuit, which is capable of supplying symmetrical power to a plurality of corona generators.

More specifically, I have invented a corona generator power supply system which includes a plurality of corona generators and power transformers therefor, all the primary windings of the transformers being connected to bridge two parallel branches of a circuit which includes series connected, load commutated SCR means. The SCR means are alternately fired in conductive pairs to create opposite conductive paths through the primary winding. To reduce the number of SCR's required, at least one of the parallel branches of series SCR's is shared by two primary windings.

Figure 1:
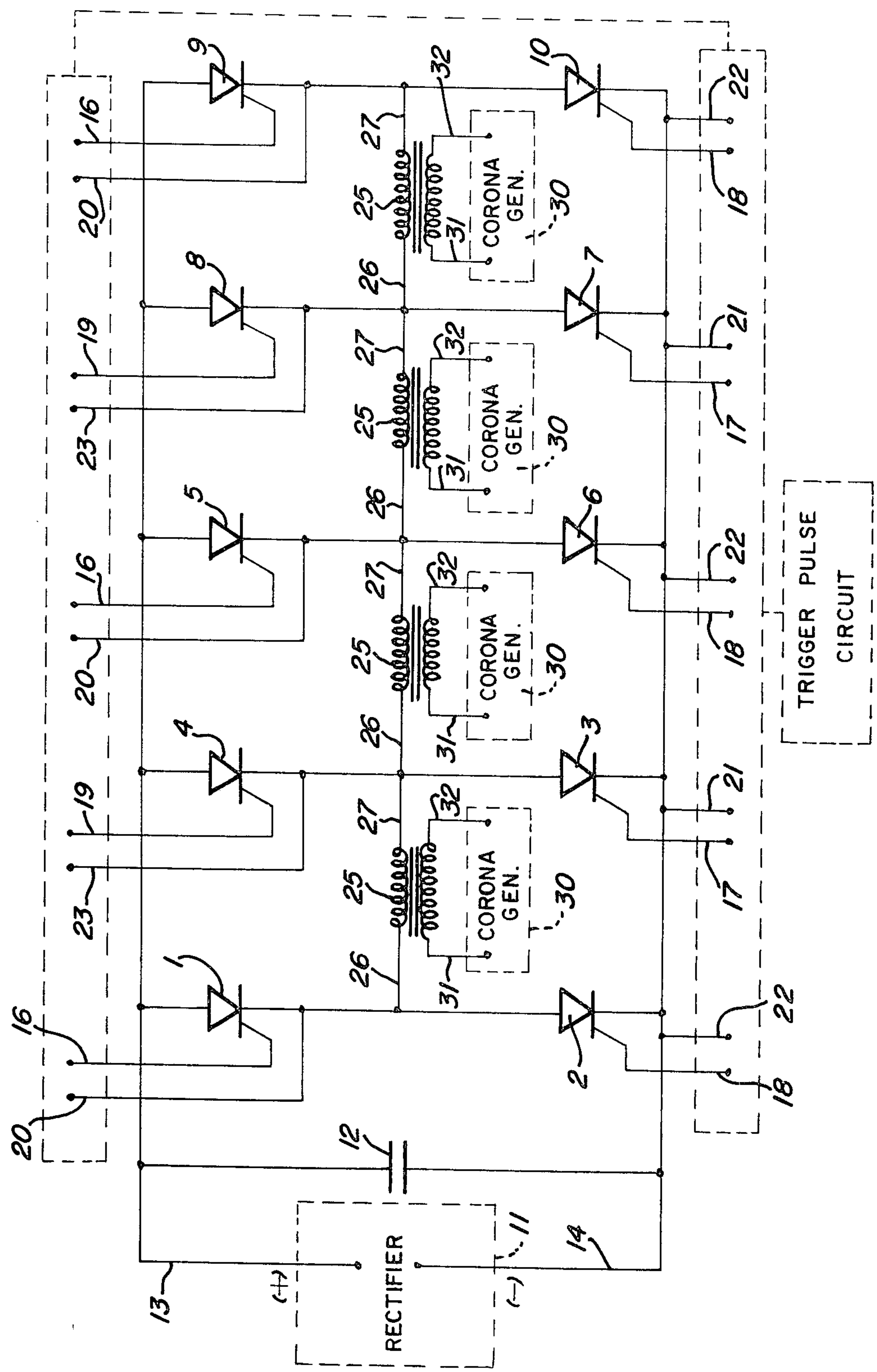
FIG. 1 is a circuit diagram of a frequency converter of the present invention.

A more clear understanding of my invention may be obtained by reference to FIG. 1 of the drawing which discloses a circuit that includes SCR means 1, 2, 3, 4, 5, 6, 7, 8, 9 and 10. The circuit of FIG. 1 also includes a DC power supply means 11, the details of which are set forth in the rectifier circuit of FIG. 3. The circuit also includes a capacitor 12 which is connected across the output of the rectifier 11 by means of electrical conduits 13 and 14. The output of the rectifier 11 as conducted by the conduits 13 and 14 is also applied to the SCR's 1 through 10.

The SCR's 1 through 10 are connected to a trigger pulse circuit which is depicted as being enclosed within the broken line 15. The details of the construction of the pulse circuit 15 are set forth in FIG. 2. Pulse circuit 15 is functionally connected with SCR's 1 through 10 by means of conductors 16 17, 18, 19, 20, 21, 22 and 23. As shown in the drawing conductor 16 is connected to the gate lead of SCR 1, 5 and 9, while conductor 17 is interconnected to the gate lead of SCR 3 and 7. The conductor 18 is connected to the gates of SCR's 2, 6 and 10, while conductor 19 interconnects the gates of SCR's 4 and 8 with the trigger circuit 15. The pulse circuit connections between circuit 15 and the SCR's 1, 5 and 9 is completed by the conductor 20, while conductor 21 is shown as being applied to SCR's 3 and 7. Conductor 22 interconnects with the output side of SCR's 2, 6 and 10, while the conductor 23 connects with the output sides of SCR's 4 and 8.

As shown in FIG. 1, SCR's 1 and 2, 4 and 3, 5 and 6, 8 and 7, and 9 and 10 are series connected in pairs to form parallel branches between the output leads 13 and 14 of the rectifier 11. The parallel branches which are formed by series connector SCR's 1 and 2, and 4 and 3, are bridged by the primary winding of power transformer 25, as interconnected to the branches by leads 26 and 27. Likewise, the parallel branch which is formed by SCR's 5 and 6 is bridged to the parallel branch formed by SCR's 4 and 3 by means of an additional power transformer 25, interconnected thereto by means of leads 26 and 27. Likewise, the additional parallel branches formed by SCR's 5 and 6, 8 and 7, and 9 and 10 are bridged by similar power transformers 25. It is to be understood that while FIG. 1 shows the use of four power transformers which are interconnected with ten SCR's, as few as two power transformers interconnected with six SCR's may be utilized. Also, it is to be understood that the circuit of FIG. 1 may be extended to include as many SCR's as is practical to combine in a single circuit, for example, as many as twenty SCR's connected to form ten parallel branches which are bridged by nine power transformers, may be utilized.

As shown in FIG. 1, the secondary winding of each power transformer 25, is connected to a corona generator 30 by means of leads 31 and 32. The detail of the corona generators which are enclosed within the broken line 30 is set forth in FIGS. 4, 5 and 6.

Figure 2:
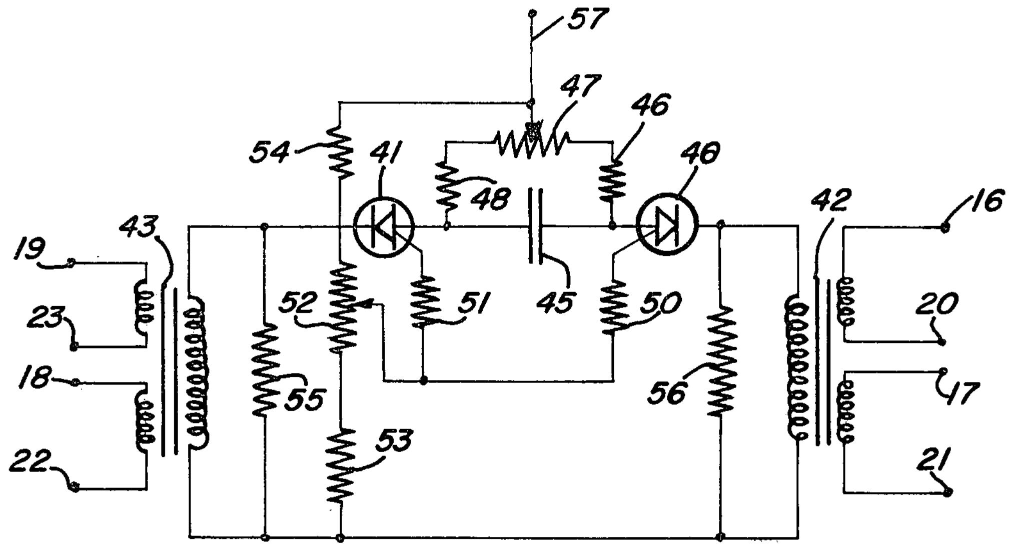
FIG. 2 is a diagram of the flip-flop trigger circuit which may be used in the converter circuit of FIG. 1.

Reference to FIG. 2 reveals a typical programmable unijunction transistor (PUT) flip-flop trigger circuit which may be used to trigger the SCR's shown in FIG. 1. In FIG. 1 a circuit such as shown in FIG. 2 is enclosed within the broken line 15.

In FIG. 2 the flip-flop circuit comprises two unijunction transistors, 40 and 41, which are connected in series with the primary side of pulse isolation transformers 42 and 43 respectively. The circuit of FIG. 2 also includes a capacitor 45 connected in series between the transistors 40 and 41. The capacitor 45 is bridged by means of parallel connected resistances 46, 47 and 48. The resistances 46 and 48 are fixed, while the resistance 47 is a variable resistance which is used to trim the symmetry of the trigger pulse output of the flip-flop circuit.

Also included in FIG. 2 are fixed resistances 50 and 51 which are connected to the gates of transistors 40 and 41 respectively. A variable resistance 52 connects the gates of the transistors 40 and 41 to the circuit, which also includes fixed resistors 53 and 54 connected in series therewith. A pair of fixed resistances, 55 and 56, are connected between the outputs of the transistors 41 and 40 respectively, and also in series with the primary windings of isolation pulse transformers 42 and 43. A lead 57 connects the circuit of FIG. 2 with a suitable source of DC power which is typically maintained at 20 volts.

The trigger circuit of FIG. 2 is interconnected to the gates of the SCR's shown in FIG. 1 through conductor pairs 16 and 20, 17 and 21, 19 and 23, and 18 and 22, each pair being connected to individual secondary windings of pulse transformers 42 and 43. It is noted that the pulse transformers 42 and 43 each power a separate pair of SCR's; specifically transformer 42 delivers pulses to SCR's 1, 3, 5, 7 & 9, while the isolation transformer 43 delivers pulses to SCR's 2, 4, 6, 8 & 10.

Figure 3:
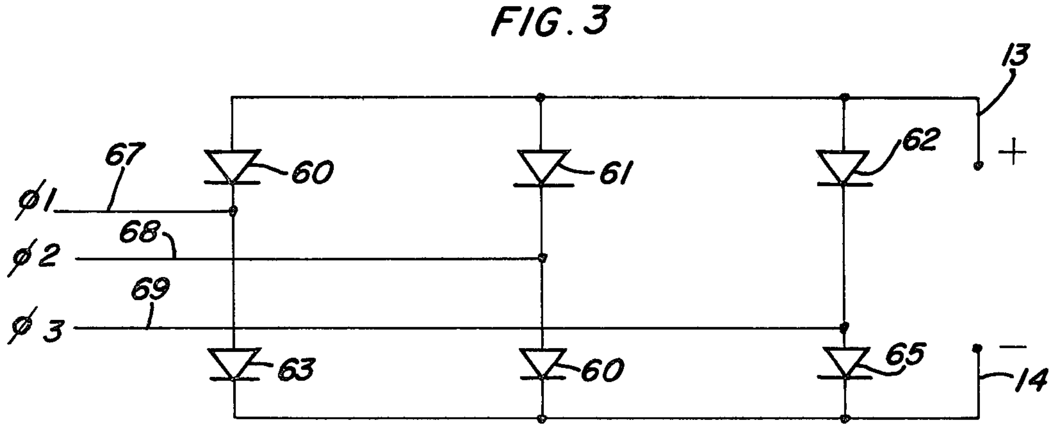
FIG. 3 is a diagram of a rectifier circuit which may be used as a source of DC power in the converter circuit set forth in FIG. 1.

FIG. 3 of the drawings represents a typical three-phase rectifier circuit, which may be used to supply DC power to the circuit shown in FIG. 1. A rectifier circuit which may be enclosed within broken line 11 of FIG. 1 is set forth in some detail in FIG. 3, and includes diodes 60, 61, 62, 63, 64 and 65. As shown in FIG. 3, the diodes are connected to a source of three-phase power, which is introduced to the circuit by means of conductors 67, 68 and 69. The output of the rectifier circuit in FIG. 3 appears across leads 13 and 14, which are connected in series with the SCR's shown in FIG. 1.

Figure 4:
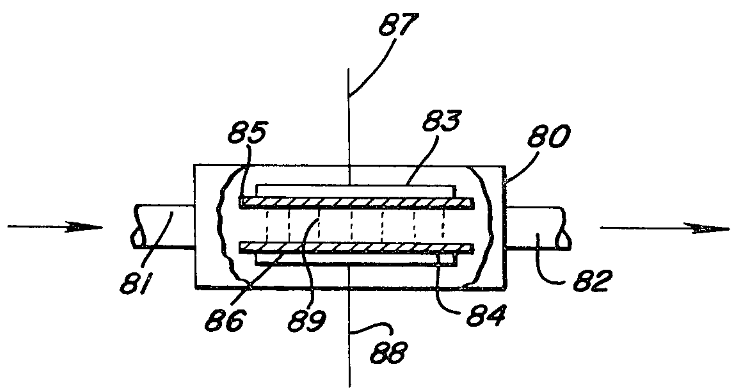
FIGS. 4, 5 and 6 are plan view diagrams with parts broken away of corona generators, which may be used as the power load in the circuit of FIG. 1.

The circuit of FIG. 1 is used to supply high frequency, symmetrical AC power to a plurality of corona generators, which are indicated in FIG. 1 as being enclosed within broken lines 30. The corona generators represented by broken lines 30 may typically comprise the corona generator devices which are set forth in FIGS. 4, 5 and 6 of the drawing. In FIG. 4, 80 represents a gas tight container which is provided with gas inlet and outlet means 81 and 82 respectively. Within the container 80 are located electrode surfaces 83 and 84. The electrode surfaces are covered with a suitable dieletric layer 85 and 86 respectively. Connected to the electrodes 83 and 84 are conductors 87 and 88, which may be interconnected with leads 31 and 32 shown in FIG. 1. The space which exists between the dielectric coated electrodes 84 and 85 is discharge gap 89.

Figure 5:
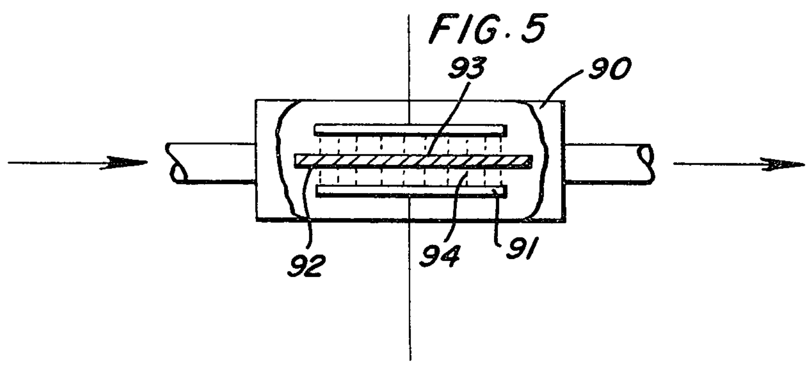
Figure 6:
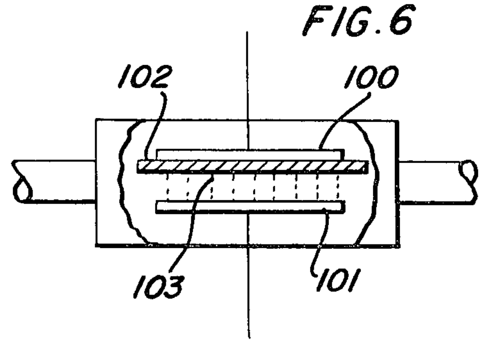

The device shown in FIG. 5 is similar to that shown in FIG. 4. However, electrodes 90 and 91 are separated by a dielectric plate 92, which defines two discharge gaps, 93 and 94. The device in FIG. 6 shows a slightly different configuration of a suitable corona discharge device, wherein electrode plates 100 and 101 are separated by means of a single dielectric layer 102, which is applied to the surface of electrode 100. A discharge gap 103 is defined by the space between electrodes 100 and 101.

In operation, the circuit of FIG. 1 is supplied with rectified electrical power by means of rectifier circuit 11 at a voltage on the order of about 150–600 volts DC. This DC power is applied across condensor 12 which serves to maintain the output of the rectifier at an acceptable constant level. The DC power as conducted through conductors 13 and 14, is applied to the SCR's 1 through 10. To commence operation of the device, the SCR's 1, 3, 5, 7 and 9 are initially fired in functional pairs 1 and 3, 3 and 5, 5 and 7, and 7 and 9, which are connected to the trigger circuit 15 by means of leads 16 and 20, and 17 and 21. To fire the SCR's the trigger circuit delivers electrical trigger pulse on the order of 20 volts at the desired operational frequency. Subsequent to delivery of the trigger pulse by the circuit 15, the SCR pairs 1 and 3, 3 and 5, 5 and 7, and 7 and 9 conduct to deliver power across the primary of the power transformers 25. When the power pulse appears across the primary of transformers 25, a transformed pulse appears across the secondary of the power transformers 25 at a voltage which is multiplied in accordance with the winding ratios of the transformers. Preferably, this winding ratio will be on the order of 8 to 1, to about 30 to 1. The transformed power pulse is then applied to the plates of the corona generators shown as 30, and which may comprise devices shown in FIGS. 4, 5 and 6. The electrical pulse delivered to the corona generator serves to ionize the gas appearing between the plates of the corona generator, whereupon the pulse is conducted. As the pulse is conducted across the gap of the corona generator, the voltage drop across the gap is clamped at a fixed value due to the conductivity of the ionized gas existing between the plates. The conduction across the plates abruptly ceases since the electrons cannot go through the dielectric. The abrupt stoppage of current creates an opposite voltage pulse to appear through the secondary winding of transformers 25, which is then transformed through the primary winding and thence to the conducting SCR's. This reverse pulse serves to shut off, that is, commutate, the then conducting SCR's to a non-conductive or blocking mode.

Subsequent to firing SCR pairs 1 and 3, 3 and 5, 5 and 7, and 7 and 9, the trigger circuit 15 then delivers an alternate trigger pulse through conductors 18, 19, 22 and 23 to the SCR's 2, 4, 6, 8 and 10 which form SCR conducting pairs 2 and 4, 4 and 6, 6 and 8 and 8 and 10. SCR pairs 2 and 4, 4 and 6, 6 and 8 and 8 and 10 then conduct a power pulse through the secondary of power transformers 25 in a direction opposite to the pulse previously transmitted by SCR pairs 1 and 3, 3 and 5, 5 and 7 and 7 and 9. This power pulse appears across the plates of corona generator 30 with a polarity opposite to that of the previously delivered pulse. Thus, it is seen that by alternately firing SCR pairs 1 and 3, 3 and 5, 5 and 7 and 7 and 9, and then SCR pairs 2 and 4, 4 and 6, 6 and 8, and 8 and 10, the power pulses appearing across the corona generator plates are symmetrical, and each plate is therefore alternately charged to opposite polarity.

In operation of the apparatus it is of significant importance that the output of the trigger circuit 15 and power transformer 25 be maintained as symmetrical as possible to minimize electro-mechanical vibrations in the power transformer 25. When the current is tuned to produce a string of positive pulses within about 0.1 microsecond of being with the center of the negative string, the vibrations cancel and noise level is at a minimum.

The flip-flop trigger circuit which is shown in FIG. 2, as well as the rectifier circuit shown in FIG. 3, is conventional, and operate in the conventional manner. Furthermore, the corona generator devices shown in FIGS. 4, 5 and 6 represent conventional corona generator type apparatus, wherein the electrodes and dielectric plates thereof may be assembled in various configurations. Preferably, the corona generators include a thin dielectric separator which has a thickness on the order of 0.1 to 0.5 mm. The discharge gap between the dielectric surfaces is preferably on the order of 0.5 to 3.0 mm. The corona generator devices may be used to convert oxygen to ozone, or alternatively the generators may be used to induce a variety of chemical reactions which take place within a high voltage discharge corona.

The trigger circuit shown in FIG. 3 is preferably operated at a frequency of from about 100 to 10,000 Hz. The output of the SCR circuit is preferably transformed by power transformer 25 so as to produce an output voltage to the corona generator load on the order of from about 4,000 to 15,000 volts peak. While in the present drawing the electrical load in FIG. 1 comprises a corona generator, it should also be understood that the frequency converter circuit of FIG. 1 may be used to supply high frequency, high voltage power to electrical loads which comprise resistance capacitance characteristics similar to that of a corona genrator device.

To further indicate the construction of the present circuits, the following table is given to indicate the values of the various circuit elements set forth therein.

TABLE

| Figure | Component & Ref. No. | Volume and/or Mfg. Description |
|---|---|---|
| 1 | SCR 1, 2, 3, 4, 5, 6, 7, 8, 9 and 10 | GE types C392, C393, C394, C395 or C609 |
| | Capacitor 12 | Oil Filled 10 to 100 mf |
| | Transformers 25 | Secondary/Primary Ratio 10/1; 125 KVA |
| 2 | Transistor 40 & 41 | 2N6027 or 2N6028 |
| | Transformer 42 & 43 | Pulse Engineering, Inc. Type 5258 |
| | Capacitor 45 | 0.01 mf |
| | Resistor 46 | 10 K ohms |
| | Variable Resistor 47 | 50 K ohms |

TABLE-continued

| Figure | Component & Ref. No. | Volume and/or Mfg. Description |
|---|---|---|
| | Resistor 48 | 10 K ohms |
| | Resistor 50 & 51 | 100 K ohms |
| | Variable Resistor 52 | 1 K ohm |
| | Resistor 53 & 54 | 100 ohms |
| | Resistor 55 & 56 | 470 ohms |
| 3 | Diode 60, 61, 62, 63, 64 & 65 | A90-11-S-F1A1 1000 v 4500 surge amps. |

The above description clearly describes and sets forth an improved solid-state corona generation system which may be used for a variety of purposes, including the production of ozone from oxygen.

I claim:

1. A corona reaction system which comprises:

a. A plurality of corona reactors, each connected to the primary winding of power transformers therefor, b. A source of DC power, c. A plurality of series connected SCR means comprising at least a first SCR means in series with a second SCR means, a third SCR means in series with a fourth SCR means, and a fifth SCR means in series with a sixth SCR means, said series connected SCR means connected as parallel branches in series with said source of DC power, the primary windings of each of said power transformers being connected to individually bridge a pair of said parallel branches; and d. Trigger pulse means adapted to fire said SCR means at a desired frequency, said first, third and fifth SCR means being fired in unison to form a conductive path through said power transformers in one direction, and said second, fourth and sixth SCR means being fired in unison to form a conductive path in the opposite direction.

2. The system of claim 1 which includes up to 10 of said parallel branches and nine of said power transformers.

3. The system of claim 1 wherein said corona reactors are ozone generators.

4. The system of claim 1 wherein the winding ratios of said power transformers range from about 8 to 1 to about 30 to 1.

5. The system of claim 1 wherein said trigger pulse means comprises a programmable unijunction transistor flip-flop trigger circuit.

6. The system of claim 5 wherein said trigger circuit is adapted to operate at a frequency of from about 100 to 10,000 Hz.

7. The system of claim 1 wherein said corona generators include discharge electrodes coated with a dielectric having a thickness of 0.1 to about 0.5 mm and a discharge gap on the order of about 0.5 to 3.0 mm.

* * * * *